Patented Apr. 19, 1927.

1,625,771

UNITED STATES PATENT OFFICE.

KARL SCHÖLLKOPF, OF DUSSELDORF-OBERKASSEL, GERMANY, ASSIGNOR TO RHEINISCHE KAMPFER-FABRIK GESELLSCHAFT MIT BESCHRANKTER HAFTUNG, OF DUSSELDORF-OBERKASSEL, GERMANY.

MANUFACTURE OF MENTHOL.

No Drawing. Application filed November 28, 1922, Serial No. 603,853, and in Germany November 23, 1921.

The present invention refers to the manufacture of racemic menthol being optically inactive, but having besides this point the properties of the active menthol as obtained from natural sources. Sabatier and Brunel have described (see Comptes rendus, Volume 137, page 1268 and volume 140, page 252) that the vapours of thymol when conducted over heated nickel give in the presence of hydrogen two isomeric menthols and varying amounts of menthone. Pickard and Littlebury (Chemical Society Journal Volume 101, page 109, Transactions 1921) have cleared up the chemical constitution of the menthols obtained according to Sabatier and Brunel. According to the theory two inactive menthones (i-menthone and i-isomenthone) are possible and 4 inactive menthols, corresponding to the 2 inactive menthones.

The present process consists in heating thymol in presence of catalysts promoting the hydrogenation with hydrogen under pressure, separating by physical processes from the reaction product the crystallizable, crystalline racemate of menthol and subjecting the remaining liquid, non crystallizable mixture of isomeric menthols to a new hydrogenation process with catalysts under pressure, if desired after having been added to fresh thymol. By the hydrogenation of thymol with catalysts under pressure a mixture of several substances is formed, the racemate of the natural active menthol (which may be separated by physical operations, as fractional distillation or a freezing process, from liquid menthols) and liquid menthols, hereinafter called "liquid menthols mixture." The liquid menthols mixture consists of the inactive alcohols of the i-menthone (semicarbazone melting at 158 degrees centigrade), called i-menthol, melting point 34 degrees centigrade and i-neomenthol, melting point 51 degrees centigrade, see Pickard and Littlebury cited above.

Suitable catalysts for the present process are for instance nickel, cobalt, platinum, palladium. The process may be carried out in any suitable apparatus which is capable of resisting high pressures, for instance an autoclave.

The liquid menthols mixture, separated from the racemate of the natural active menthol may be heated again with catalysts promoting the hydrogenation and hydrogen under pressure or the said liquid menthols mixture may be added to thymol and the said mixture heated with catalysts promoting the hydrogenation under pressure, whereupon the product of the hydrogenation is subjected to the physical separation processes (fractional distillation or freezing process).

*Example.*—25 kilograms thymol are heated with 500 grams nickel catalyst and hydrogen to about 200 degrees centigrade under a pressure of 5–30 atmospheres. I may carry out the process in an autoclave and agitate the mass. After sufficient amounts of hydrogen have been absorbed, one separates the product of hydrogenation from the catalysts by distillation or filtration and separates the menthol from the liquid menthols mixture either by a freezing process or by fractional distillation. By the freezing process (for instance at zero or minus five degrees centigrade) the menthol is solidified whereas the liquid menthols mixture remains fluid and may be decanted or otherwise separated from the crystallized menthol.

The liquid menthols mixture thus obtained is heated with 250–500 grams nickel catalyst and hydrogen to about 200 degrees centigrade under a pressure of 5–30 atmospheres. The reaction product is then treated as above described for the hydrogenation product of thymol.

Instead of treating the liquid menthol mixture with hydrogenation catalysts and hydrogen as described I may add the liquid menthol mixture to thymol, as for instance 25 kilograms, and heat the said mixture with hydrogen and 500–750 grams nickel catalyst or more to about 200 degrees centigrade under a pressure of about 5–30 atmospheres. The reaction product is then treated as above described for the hydrogenation product of thymol.

I claim:—

1. The process for manufacturing inactive menthol which consists in heating thymol with catalysts promoting the hydrogenation and hydrogen under pressure, separating the inactive menthol from the liqud menthols mixture by physical methods and heating the latter mixture with catalysts promoting the hydrogenation and hydrogen under pressure.

2. The process for manufacturing inactive menthol which consists in heating thymol with catalysts promoting the hydrogenation and hydrogen under pressure, separating the inactive menthol from the liquid menthols mixture, adding the latter to a new portion of thymol and heating this mixture with catalysts promoting the hydrogenation and hydrogen under pressure.

3. The process for manufacturing inactive menthol which consists in heating thymol with catalysts promoting the hydrogenation and hydrogen under pressure, separating the inactive menthol from the liquid menthols mixture by subjecting the mass to a freezing process and heating the liquid menthols mixture with catalysts promoting the hydrogenation and hydrogen under pressure.

In testimony whereof I hereunto affix my signature.

KARL SCHÖLLKOPF.